(12) United States Patent
Cabuz et al.

(10) Patent No.: US 6,968,862 B2
(45) Date of Patent: Nov. 29, 2005

(54) ELECTROSTATICALLY ACTUATED VALVE

(75) Inventors: Cleopatra Cabuz, Edina, MN (US); Eugen I. Cabuz, Edina, MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/980,685

(22) Filed: Nov. 3, 2004

(65) Prior Publication Data

US 2005/0062001 A1 Mar. 24, 2005

Related U.S. Application Data

(62) Division of application No. 10/174,851, filed on Jun. 19, 2002, now Pat. No. 6,837,476.

(51) Int. Cl.[7] .................................................. F16K 1/00
(52) U.S. Cl. ............ 137/625.48; 137/872; 251/129.01
(58) Field of Search ........................... 137/625.48, 872; 251/129.01

(56) References Cited

U.S. PATENT DOCUMENTS

| | | |
|---|---|---|
| 2,403,692 A | 7/1946 | Tibbetts |
| 2,975,307 A | 3/1961 | Shroeder et al. |
| 3,304,446 A | 2/1967 | Martinek et al. |
| 3,381,623 A | 5/1968 | Elliot |
| 3,414,010 A | 12/1968 | Sparrow |
| 3,641,373 A | 2/1972 | Elkuch |
| 3,769,531 A | 10/1973 | Elkuch |
| 3,803,424 A | 4/1974 | Smiley et al. |
| 3,947,644 A | 3/1976 | Uchikawa |
| 4,115,036 A | 9/1978 | Paterson |
| 4,140,936 A | 2/1979 | Bullock |
| 4,197,737 A | 4/1980 | Pittman |
| 4,418,886 A | 12/1983 | Holzer |
| 4,453,169 A | 6/1984 | Martner |
| 4,478,076 A | 10/1984 | Bohrer |
| 4,478,077 A | 10/1984 | Bohrer et al. |
| 4,498,850 A | 2/1985 | Perlov et al. |
| 4,501,144 A | 2/1985 | Higashi et al. |
| 4,539,575 A | 9/1985 | Nilsson |
| 4,576,050 A | 3/1986 | Lambert |
| 4,581,624 A | 4/1986 | O'Connor |
| 4,651,564 A | 3/1987 | Johnson et al. |
| 4,654,546 A | 3/1987 | Kirjavainen |
| 4,722,360 A | 2/1988 | Odajima et al. |
| 4,756,508 A | 7/1988 | Giachino et al. |
| 4,821,999 A | 4/1989 | Ohtaka |
| 4,898,200 A | 2/1990 | Odajima et al. |
| 4,911,616 A | 3/1990 | Laumann, Jr. |

(Continued)

FOREIGN PATENT DOCUMENTS

DE 19617852 1/1993

(Continued)

OTHER PUBLICATIONS

Athavale et al., "Coupled Electrostatics-Structures-Fluidic Simulations of A Bead Mesopump," Proceedings of the International Mechanical Engineers Congress & Exhibition, Nashville, Tennessee, Oct. 1999.

(Continued)

*Primary Examiner*—Edward K. Look
*Assistant Examiner*—John K. Fristoe, Jr.
(74) *Attorney, Agent, or Firm*—Kris T. Fredrick

(57) ABSTRACT

An electrostatically actuated valve that is relatively small, has relatively low fabrication costs, and consumes relatively low voltage and/or power. Normally closed, normally open, three (or more) way valves, and other configurations are contemplated. These electrostatically actuated valves are suitable for a wide variety of applications, including but not limited to, low power and wireless applications, for example.

18 Claims, 10 Drawing Sheets

U.S. PATENT DOCUMENTS

| | | |
|---|---|---|
| 4,938,742 A | 7/1990 | Smits |
| 4,939,405 A | 7/1990 | Okuyama et al. |
| 5,065,978 A | 11/1991 | Albarda et al. |
| 5,069,419 A | 12/1991 | Jerman |
| 5,078,581 A | 1/1992 | Blum et al. |
| 5,082,242 A | 1/1992 | Bonne et al. |
| 5,085,562 A | 2/1992 | van Lintel |
| 5,096,388 A | 3/1992 | Weinberg |
| 5,129,794 A | 7/1992 | Beatty |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,206,557 A | 4/1993 | Bobbio |
| 5,219,278 A | 6/1993 | van Lintel |
| 5,224,843 A | 7/1993 | van Lintel |
| 5,244,527 A | 9/1993 | Aoyagi |
| 5,244,537 A | 9/1993 | Ohnstein |
| 5,322,258 A | 6/1994 | Bosch et al. |
| 5,323,999 A | 6/1994 | Bonne et al. |
| 5,325,880 A | 7/1994 | Johnson et al. |
| 5,441,597 A | 8/1995 | Bonne et al. |
| 5,452,878 A | 9/1995 | Gravesen et al. |
| 5,499,909 A | 3/1996 | Yamada et al. |
| 5,541,465 A | 7/1996 | Higuchi et al. |
| 5,552,654 A | 9/1996 | Konno et al. |
| 5,571,401 A | 11/1996 | Lewis et al. |
| 5,642,015 A | 6/1997 | Whitehead et al. |
| 5,683,159 A | 11/1997 | Johnson |
| 5,725,363 A | 3/1998 | Bustgens et al. |
| 5,759,014 A | 6/1998 | Van Lintel |
| 5,759,015 A | 6/1998 | Van Lintel et al. |
| 5,822,170 A | 10/1998 | Cabuz et al. |
| 5,836,750 A | 11/1998 | Cabuz |
| 5,863,708 A | 1/1999 | Zanzucchi et al. |
| 5,901,939 A | 5/1999 | Cabuz et al. |
| 5,911,872 A | 6/1999 | Lewis et al. |
| 5,954,079 A | 9/1999 | Barth et al. |
| 6,106,245 A | 8/2000 | Cabuz |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,192,197 B1 | 2/2001 | Ono |
| 6,215,221 B1 | 4/2001 | Cabuz et al. |
| 6,240,944 B1 | 6/2001 | Ohnstein et al. |
| 6,288,472 B1 | 9/2001 | Cabuz et al. |

FOREIGN PATENT DOCUMENTS

| | | |
|---|---|---|
| EP | 0744821 A2 | 11/1996 |
| EP | 0744821 A3 | 12/1996 |
| JP | 05-219760 | 8/1993 |
| JP | 02-86258 | 10/1995 |
| SU | 744877 | 6/1980 |
| WO | WO 9729538 | 8/1997 |

OTHER PUBLICATIONS

B. Halg, "On a Nonvolatile Memory Cell Based on Micro-Electro-Mechanics", Proceedings of MEMS CH2832-4/90/000-0172 IEEE (1990), pp. 172-176.

Bertz, Schubert, Werner, "Silicon Grooves With Sidewall Angles Down to 1° made By Dry Etching", pp. 331-339.

Branebjerg, Gravesen, "a New Electrostatic Actuator Providing Improved Stroke Length and Force." Micro Elctro Mechanical System '92 (Feb. 4-7, 1992), pp. 6-11.

Bustgens, Bacher, Menz, Schomburg, "Micropump Manufactured by Thermoplastic Molding" MEMS 1994, pp. 18-21.

C. Cabuz et al., "Factors Enhancing the Reliability of Touch-Mode Electrostatic Actuators," Sensors and Actuators 79(2000) pp. 245-250.

C. Cabuz et al., "Mesoscopic Sampler Based on 3D Array of Electrostatically Activated Diaphragms," Proceedings of the 10th Int. Conf. On Solid-State Sensors and Actuators, Transducers'99, Jun. 7-12, 1999, Sendai Japan.

C. Cabuz et al., "The Double Diaphragm Pump," The 14th IEEE International Micro Electro Mechanical Systems conference, MEMS'01, Jan. 21-23, Interlachen, Switzerland.

C. Cabuz, et al., "High Reliability Touch-Mode Electrostatic Actuators", Technical Digest of the Solid State Sensor and Actuator Workshop, Hilton Head, S.C., Jun. 8-11, 1998, pp. 296-299.

C. Cabuz. Tradeoffs in MEMS Material (Invited Paper) Proceedings of the SPIE, vol. 2881, pp. 160-170, Austin, TX., Jul. 1996.

Cabuz, Cleopatra, "Electrical Phenomena at the Interface of Rolling-Contact, Electrostatic Actuators", Nanotribology: Critical Assessment and Research Needs, Kluwer Academic Publisher, pp. 221-236, Copyright 2003, presented at the Nanotribology Workshop, Mar. 13-15, 2000.

Cleo Cabuz, "Dielectric Related Effects in Micromachined Electrostatic Actuators," Annual Report of the IEEE/CEIDP Society, 1999, Annual Meeting, Austin, Texas, Oct. 17-20, 1999.

Jye-Shane Yang et al., "Fluorescent Porous Polymer Films as TNT Chemosensors: Electronic and Structural Effects", *J. Am. Chem. Soc.*, 1998, 120 pages 11864-11873.

Jye-Shane Yang et al., "Porous Shape Persistent Fluorescent Polymer Films: An Approach to TNT Sensory Materials", *J. Am. Chem. Soc.;*, 1998, 120, pp. 5321-5322.

Michael S. Freund et al., "A Chemically Diverse Conducting Polymer-Based 'Electronic Nose'", Proceedings of the National Academy of Sciences of the United States of America, vol.92, No. 7, Mar. 28, 1995, pp. 2652-2656.

Minami K et al., "Fabrication of Distributed Electrostatic Micro Actuator (DEMA)" Journal of Microelectromechanical Systems, US, IEEE Inc., New York, vol. 2, No. 3, Sep. 1, 1993, pp. 121-127, XP000426532, ISSN: 1057-7157.

Porex Technologies, brochure, dated prior to Jun. 2, 2000, 4 pages.

Shikida, Sato, "Characteristics of an Electrostatically-Driven Gas Valve Under High Pressure Conditions, IEEE 1994, pp. 235-240.".

Shikida, Sato, Harada, "Fabrication of An S-Shaped Microactuator," Journal of Microelectromechanical Systems, vol. 6, No. 1 (Mar. 1997), pp. 18-24.

Shikida, sato, Tanaka, Kawamura, Fujisaki, "Electrostatically Driven Gas Valve With High Conductance", Journal of Microelectromechanical Systems, vol. 3, No. 2 (Jun. 1994), pp. 76-80.

Srinivasan et al., "Self-Assembled Fluorocarbon Films for Enhanced Stiction Reduction", TRANSDUCERS '97, 1997 International Conference on Solid-State Sensors and Actuators, Chicago, Jun. 16-19, 1997, pp. 1399-1402.

Wagner, Quenzer, Hoerscelmann, Lisec, Juerss, "Bistable Microvalve with Pneumatically Coupled Membranes," 0-7803-2985-6/96, IEEE (1996), pp. 384-388.

ELECTROSTATICALLY ACTUATED VALVE

This application is a Divisional of U.S. patent application Ser. No. 10/174,851, filed Jun. 19, 2002 now U.S. Pat. No. 6,837,476.

BACKGROUND

The present invention generally relates to electro-pneumatic transducers, and more particularly, to electrostatically actuated valves.

Many industrial, commercial, aerospace, military and other applications depend critically on reliable valves for fluid (including gas) handling. In a chemical plant, for example, valves are often used to control the flow of fluid throughout the facility. Likewise, in an airplane, valves are often used to control air and fuel delivery, as well as some of the hydraulic systems that drive the control surfaces of the airplane. These are just a few examples of the many applications that depend critically on reliable valves for fluid (including gas) handling.

In many cases, one or more main valves are used to directly control the fluid. In other cases, smaller control or pilot valves are used to control the operation of a main valve. In any cases, it is often desirable to minimize the power and/or voltage required to operate the main and/or pilot valves, particular in wireless applications but also in other applications. While some prior art valves perform satisfactory for some applications, many have significant shortcomings including a relatively large size and weight, a relatively large voltage and/or power requirement, a relatively high fabrication cost, and/or other shortcomings.

SUMMARY

The present invention provides an electrostatically actuated valve that is relatively small, has relatively low fabrication costs, and consumes relatively low voltage and/or power. Normally closed, normally open and three (or more) way valve configurations are shown for illustrative purposes, but other configurations are contemplated and are within the scope of the present invention. The electrostatically actuated valves of the present invention are suitable for a wide variety of applications, including wireless applications.

In one illustrative normally closed valve, a body is provided that is configured to form a chamber. The chamber has a first port and a second port. The first port may be, for example, an input port and the second port may be an output port of the valve. A diaphragm is mounted in the chamber. The diaphragm may have a first position that restricts fluid from flowing between the first port and the second port, and a second position that allows fluid to flow between the first port and the second port.

A first electrode may be secured relative to the diaphragm, and a second electrode may be secured relative to the body. When a voltage is applied between the first electrode and the second electrode, the first electrode may be electrostatically pulled toward the second electrode. This moves the diaphragm from the first position, which restricts the fluid to flow between the first port and the second port, toward the second position, which allows fluid to flow between the first port and the second port.

In some embodiments, the chamber has a first opposing wall and a second opposing wall, with the second electrode secured relative to the second opposing wall. The first opposing wall and the second opposing wall may be configured such that the spacing between the first opposing wall and the second opposing wall is smaller in a first region of the chamber than in an adjacent second region. In some embodiments, the first region is toward the edge or edges of the chamber and the second region is toward the center of the chamber. The diaphragm is mounted between the first opposing wall and the second opposing wall such that the diaphragm can be electrostatically pulled toward the second electrode in a rolling action, beginning in the first region. This rolling action may significantly reduce the voltage and power required to pull the diaphragm from the first position to the second position. This may be particularly beneficial in, for example, applications where a battery or some other limited power source is used to power the valve.

In some embodiments, the diaphragm may become elastically deformed when it is electrostatically pulled toward the second position. When so provided, the diaphragm may return to the first position under elastic restoring forces when the voltage is removed or reduced between the first electrode and the second electrode. Thus, the diaphragm may only need to be electrostatically actuated in one direction, with the elastic restoring forces returning the diaphragm.

In some embodiments, the diaphragm may be configured to be in the second position in the un-activated state. This may be accomplished by, for example, pre-shaping the diaphragm. When so provided, and in some embodiments, the diaphragm may become elastically deformed when it is electrostatically pulled toward the first position when a voltage is applied between the first electrode and the second electrode. Such a force may be created by, for example, applying like charges to both the first and second electrodes, creating a repelling electrostatic force. Alternatively, or in addition, the second electrode may be secured relative to the first opposing wall, wherein the diaphragm is electrostatically pulled toward the first position when a voltage is applied between the first electrode and the second electrode.

Regardless of the configuration of the diaphragm, the first and second electrodes may be used to cause actuation of the diaphragm in both directions, by first applying a voltage differential to the first and second electrodes to pull the diaphragm toward the second position, and then applying similar charges to each, generating a repellant electrostatic force to push the diaphragm back to the first position. Alternatively, or in addition, a third electrode may be secured relative to the first opposing wall such that the diaphragm can be electrostatically pulled toward the third electrode by applying a voltage differential between the first electrode and the third electrode. When so provided, the first opposing wall may be configured such that the spacing between the first opposing wall and the diaphragm is smaller in a first region of the chamber than in an adjacent second region, thereby allowing the diaphragm to be electrostatically pulled toward the third electrode in a rolling action, beginning in the first region.

In some embodiments, the first port may extend through the first opposing wall and into the chamber, and the second port may extend through the second opposing wall and into the chamber. The diaphragm, which is mounted between the first opposing wall and the second opposing wall, may have at least one opening that is laterally offset from the first port in the first opposing wall when the diaphragm is positioned in the first position adjacent the first opposing wall. The diaphragm may be configured to cover or otherwise restrict fluid from flowing through the first port and into the chamber when the diaphragm is in the first position adjacent the first opposing wall. When the diaphragm is electrostatically pulled toward the second opposing wall, the diaphragm may move away and uncover the first port, thereby allowing fluid to flow between the first port and the second port via the one or more openings in the diaphragm.

In yet another illustrative embodiment, the first port and the second port may extend through the first opposing wall and into the chamber. The diaphragm may be configured to cover or otherwise restrict fluid from flowing through the first port and into the chamber when the diaphragm is in the first position adjacent the first opposing wall. When the diaphragm is electrostatically pulled toward the second opposing wall, the diaphragm may move away and uncover the first port, thereby allowing fluid to flow between the first port and the second port. This embodiment may provide an electrostatically actuated valve that does not expose the fluid to the electric field used to electrostatically actuate the valve. In some applications, the dielectric, conductive, polar or other properties of the fluid can affect the magnitude of the electrostatic force between the actuation electrodes of the valve. This may reduce the efficiency and/or reliability of the valve. In addition, the electric field applied between the electrodes of the valve may impact or change the properties of the fluid that is controlled by the valve, when the fluid is exposed to the electric field. This illustrative embodiment may avoid some of these difficulties.

An illustrative embodiment of a normally open valve may include a body that is configured to form a chamber. The chamber may have a first opposing wall and a second opposing wall, wherein the first opposing wall and the second opposing wall are configured such that the spacing between the first opposing wall and the second opposing wall is smaller in a first region of the chamber than in an adjacent second region. In some embodiments, the first region is toward the edge or edges of the chamber, and the second region is toward the center of the chamber. A diaphragm may be mounted between the first opposing wall and the second opposing wall, and may have a first position that allows fluid to flow between a first port and a second port. A first electrode may be secured relative to the diaphragm, and a second electrode may be secured relative to the body. Like above, the diaphragm may be adapted to be electrostatically pulled toward the second electrode in a rolling action beginning in the first region toward the second position when a voltage is applied between the first electrode and the second electrode. When actuated, the diaphragm may restrict fluid from flowing between the first port and the second port.

In some embodiments, the first port and second port extend through the second opposing wall and into the chamber, with the second electrode secured relative to the second opposing wall. The diaphragm may then be electrostatically pulled toward the second opposing wall when a voltage is applied between the first electrode and the second electrode, thereby restricting fluid from flowing between the first port and the second port. In some embodiments, the diaphragm is elastically deformed when it is electrostatically pulled toward the second position, and returns to the first position under elastic restoring forces when not electrostatically pulled toward the second position.

In another illustrative embodiment, the diaphragm may separate the chamber into a first region and a second region. The first region may extend between the diaphragm and the first opposing wall, and the second region may extend between the diaphragm and the second opposing wall. In this illustrative embodiment, the first region may be in fluid communication with the first port, and the second region may be in fluid communication with the first port and the second port, at least when the diaphragm is in the first position. By having the first region and second region in fluid communication with the first port (e.g. inlet port), the actuation force required to move the diaphragm from the first position to the second position may be reduced because there is little or no pressure differential across the diaphragm.

An illustrative embodiment of a three-way may include a body that is configured to form a chamber. The chamber may have a first opposing wall and a second opposing wall. A diaphragm, which is mounted between the first opposing wall and the second opposing wall, may have at least one opening therein. A first electrode may be secured relative to the diaphragm, and a second electrode may be secured relative to the body. The diaphragm may have a first position that allows fluid to flow between an inlet port and a first outlet port through the at least one opening, and a second position that allows fluid to flow between the inlet port and a second outlet port. In the second position, the at least one opening may be restricted to reduce or prevent fluid from flowing between the inlet port and the first outlet port. Like above, the diaphragm may be adapted to be electrostatically pulled toward the second electrode in a rolling action when a voltage is applied between the first electrode and the second electrode, which may then move the diaphragm from the first position to the second position.

In some embodiments, the inlet port and the second outlet port may extend through the first opposing wall and into the chamber. The first outlet port may extend through the second opposing wall and into the chamber, with the second electrode secured relative to the second opposing wall. The at least one opening in the diaphragm may be laterally offset from the second outlet port in the first opposing wall when the diaphragm is positioned in the first position adjacent the first opposing wall. In the first position, the diaphragm may allow fluid to flow from the inlet port in the first opposing wall to the first outlet port in the second opposing wall through the at least one opening, while restricting or preventing fluid from flowing between the inlet port and the second outlet port.

When the diaphragm is electrostatically pulled toward the second opposing wall, the diaphragm may move away and uncover the second outlet port, thereby allowing fluid to flow between the inlet port and the second outlet port. When the diaphragm is pulled sufficiently close to the second opposing wall, the at least one opening in the diaphragm may become restricted, which may restrict or prevent fluid from flowing between the inlet port and the first outlet port.

In addition to the foregoing illustrative embodiment, various other electrostatically actuated valves are contemplated, some of which are described below.

DETAILED DESCRIPTION

Figure 1:
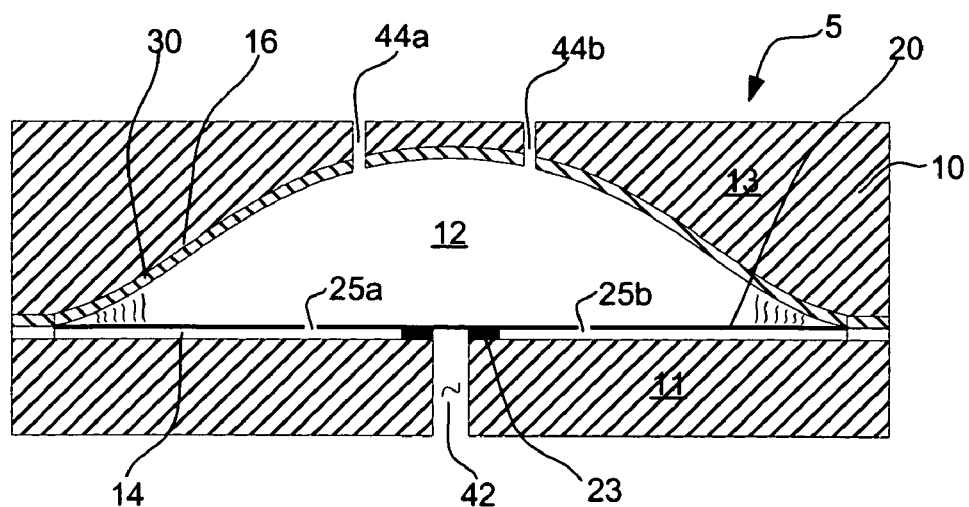
FIG. 1 is a cross-sectional side view of an illustrative normally closed valve in accordance with the present invention.

The following description should be read with reference to the drawings wherein like reference numerals indicate like elements throughout the several views. The detailed description and drawings are presented to show embodiments that are illustrative of the claimed invention.

FIG. 1 is a cross-sectional side view of an illustrative normally closed valve in accordance with the present invention. The valve is generally shown at 5, and has a body 10 with a first opposing wall 14 and a second opposing wall 16 that define a valve chamber 12. In the illustrative embodiment, a first port 42 (e.g. inlet port) extends into the valve chamber 12 through the first opposing wall 14. One or more second ports (e.g. outlet ports), such as ports 44a and 44b, extend into the valve chamber 12 through the second opposing wall 16.

A diaphragm 20 is mounted within the chamber 12. In some embodiments, this may be accomplished by sandwiching the diaphragm 20 between an upper body portion 13 and a lower body portion 11. In the illustrative embodiment, the diaphragm 20 extends along the first opposing wall 14 in the un-activated state. In some embodiments, the diaphragm 20 is spaced from the first opposing wall 14 except along a valve seat 23, which extends around the first port 42. To actuate the diaphragm 20, the diaphragm 20 may include one or more electrodes, which may extend to at least near the edges of the chamber 12. In some embodiments, the one or more electrodes of the diaphragm are surrounded or encapsulated in a dielectric material or layer.

In the embodiment shown in FIG. 1, the second opposing wall 16 includes one or more stationary electrodes, such as electrode 30. The second opposing wall 16 and the diaphragm 20 may be configured so that, in the un-activated state, the separation distance between the stationary electrode 30 and the electrode of the diaphragm 20 is smaller near the edges of the chamber 12. In other embodiments, however, the separation distance between the stationary electrode 30 and the electrode of the diaphragm 20 may be smaller in the center or any other area of the chamber 12, as desired. By providing a region in the chamber 12 that has a smaller separation distance, the diaphragm 20 may be drawn toward the second opposing wall 16 in a rolling action when a voltage is applied between the electrode of the diaphragm 20 and the stationary electrode and 30, as further shown in FIGS. 3-4. Such a rolling action may help improve the efficiency and reduce the voltage requirements of the valve.

For purposes of illustration, the first opposing wall 14 is shown generally flat. However, the first opposing wall 14 may assume other shapes, depending upon the application. For example, the first opposing wall 14 may have different regions that are recessed or protrude against the diaphragm 20 in order to, for example, reduce damage to the diaphragm 20 after continued activation. Other shapes may also be used, including curved shapes, for example. Although the second opposing wall 16 is shown to be generally curved, other shapes may be used, depending on the application.

Body 10 may be made from any suitable semi-rigid or rigid material, such as plastic, ceramic, silicon, etc. In one illustrative embodiment, the body 10 is constructed by molding a high temperature plastic such as ULTEM™ (available from General Electric Company, Pittsfield, Mass.), CELAZOLE™ (available from Hoechst-Celanese Corporation, Summit, N.J.), KETRON™ (available from Polymer Corporation, Reading, Pa.), or some other suitable material. In some embodiments, the material used for the diaphragm 20 may have elastic, resilient, flexible or other elastomeric properties. In other embodiments, the diaphragm 20 is made from a generally compliant material. In one embodiment, the diaphragm 20 is made from a polymer such as KAPTON™ (available from E. I. du Pont de Nemours & Co., Wilmington, Del.), KALADEX™ (available from ICI Films, Wilmington, Del.), MYLAR™(available from E. I. du Pont de Nemours & Co., Wilmington, Del.), or any other suitable material. An advantage of using a polymer based substrate and/or diaphragm is that the resulting valve may be cheaper and lighter, and/or more suitable for small handheld, or even disposable or reusable applications.

The one or more electrodes on the diaphragm 20 may be provided by patterning a conductive coating on the diaphragm 20. For example, the one or more electrodes may be formed by printing, plating or EB deposition of metal. In some cases, the electrode layer may be patterned using a dry film resist. The same or similar techniques may be used to provide the electrode 30 on the second opposing wall 16 of the body 10. Rather than providing a separate electrode layer, it is contemplated that the diaphragm 20 and/or second opposing wall 16 may be made conductive so as to function as an electrode, if desired. A dielectric, such as a low temperature organic and inorganic dielectric, may be used as an insulator between the actuating electrodes. The dielectric may be coated over the electrode on the diaphragm 20, the electrode 30 on the second opposing wall 16, or both, as desired.

Figure 2:
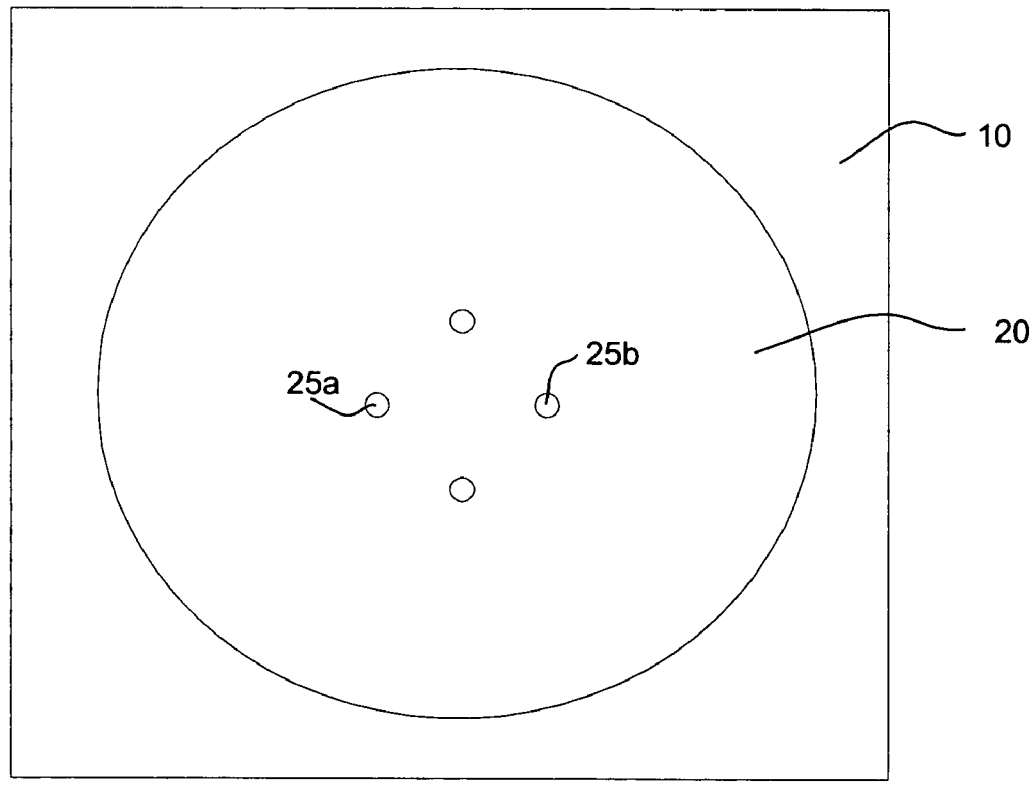
FIG. 2 is a cross-sectional top view of the illustrative normally closed valve of FIG. 1.

As shown in FIG. 1, the diaphragm 20 may have at least one opening (openings 25a and 25b) that is laterally offset from the first port 42 when the diaphragm 20 is in a first position adjacent the first opposing wall 14. FIG. 2 is a cross-sectional top view of the illustrative normally closed valve of FIG. 1. As can be seen in FIG. 2, the diaphragm 20 may include one or more openings 25a and 25b.

Figure 3:
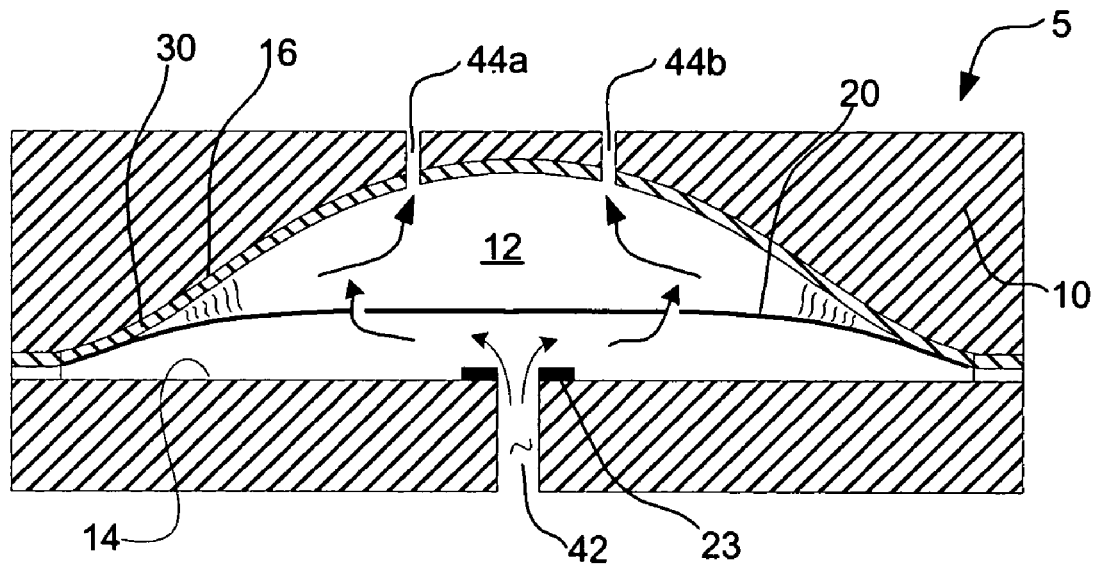
FIG. 3 is a cross-sectional side view of the illustrative normally closed valve of FIG. 1 with the diaphragm partially activated.
Figure 4:
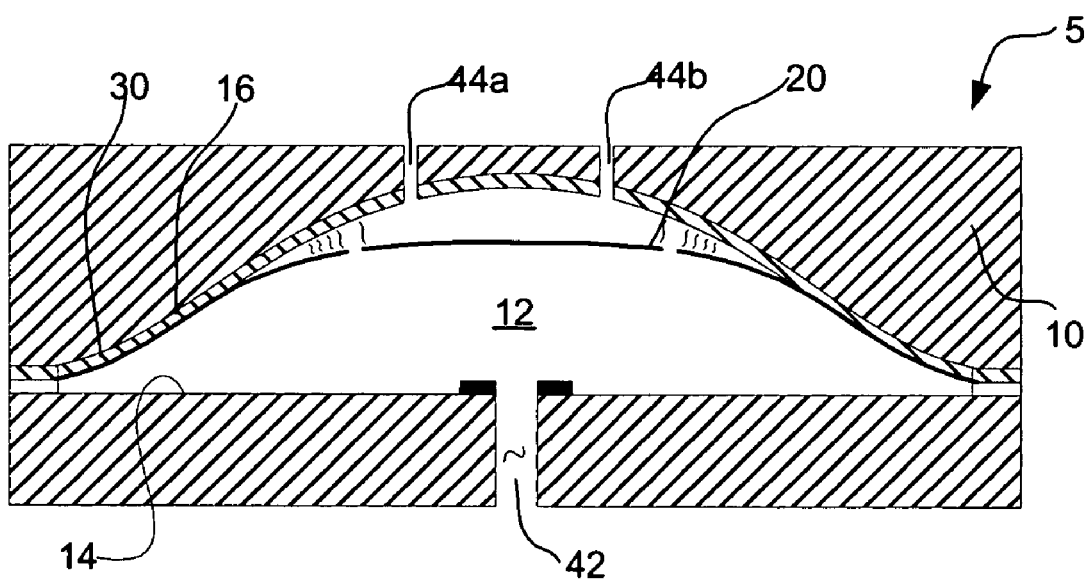
FIG. 4 is a cross-sectional side view of the illustrative normally closed valve of FIG. 3 with the diaphragm further activated.

The openings 25a and 25b in the diaphragm 20 may be configured so that the diaphragm 20 covers or otherwise restrict fluid flow through the first port 42 and into the chamber 12 when the diaphragm 20 is adjacent the first opposing wall 14. When the diaphragm is electrostatically actuated and pulled toward the second opposing wall 16, as shown in FIGS. 3–4, the diaphragm may move away and uncover the first port 42. This may allow fluid to flow between the first port 42 and the second port or ports 44a and 44b via the one or more openings 25a and 25b in the diaphragm 20.

In some embodiments, the diaphragm 20 may become elastically deformed when electrostatically pulled toward the second opposing wall 16. When so provided, the diaphragm 20 may return to the un-activated first position adjacent the first opposing wall 14 under elastic restoring forces when the activation voltage is removed or reduced between the electrode of the diaphragm 20 and the electrode 30 of the second opposing wall 16. In this illustrative embodiment, the diaphragm 20 may only need to be electrostatically actuated in one direction, with the elastic restoring forces returning the diaphragm 20 to the original un-actuated state.

To increase the elastic restoring forces, the diaphragm 20 may be disposed across the chamber 12 under tension. Alternatively, or in addition, the diaphragm 20 may be made from a material with a preformed shape to which the diaphragm 20 elastically returns after application of a deforming force. In either case, the diaphragm 20 may be made from a material, form, or disposed in a fashion such that the diaphragm 20, once deformed as shown in FIGS. 3–4, generates a restoring force that pulls the diaphragm 20 back towards the first opposing wall 14, such as shown in FIG. 1.

Figure 5:
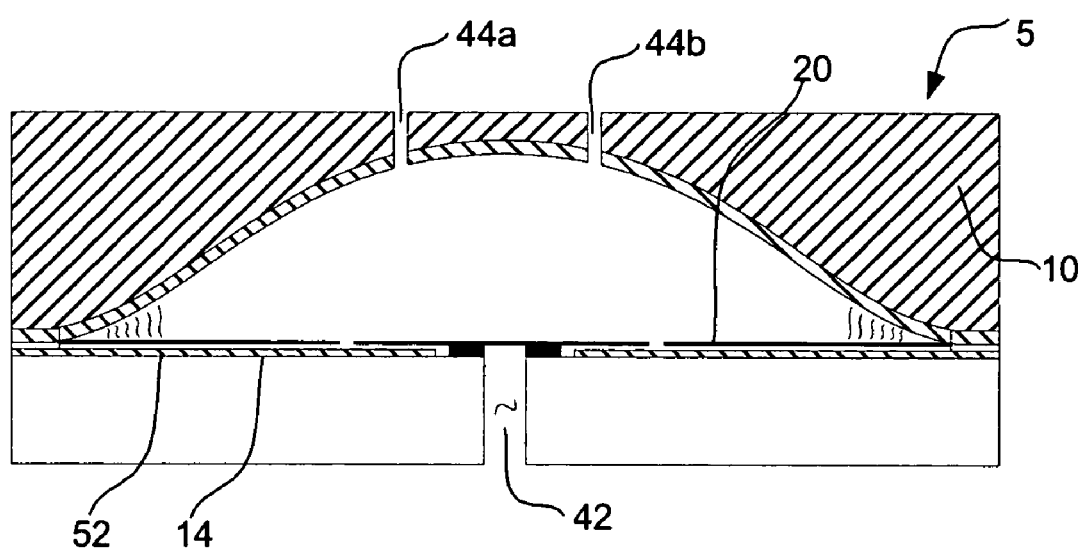
FIG. 5 is a cross-sectional side view of another illustrative normally closed valve in accordance with the present invention.

In some embodiments, supplemental restoring forces may be provided to help restore the diaphragm 20 to the un-activated first position adjacent the first opposing wall 14. In one embodiment, like charges may be applied to both the electrode on the diaphragm 20 and the electrode 30 on the second opposing wall 16, creating a repelling electrostatic force therebetween. This repelling electrostatic force may help push the diaphragm 20 back toward the first opposing wall 14. Alternatively, or in addition, supplemental restoring forces may be created by providing an additional or third electrode 52 along the first opposing wall 14, as shown in FIG. 5. By applying a voltage between the electrode on the diaphragm 20 and the additional third electrode 52, the diaphragm 20 may be pulled back toward the first opposing wall 14, preferably in a rolling action.

In some embodiments, the diaphragm 20 may be configured to be positioned away from the first opposing wall 14 in the un-activated state. This may be accomplished by, for example, pre-shaping the diaphragm 20. When so provided, and in some embodiments, the diaphragm 20 may become elastically deformed when it is electrostatically pulled toward the first opposing wall 14. Such a force may be provided by, for example, applying like charges to the electrode of the diaphragm 20 and the electrode 30 of the second opposing wall 16, thus creating a repelling electrostatic force. Alternatively, or in addition, an electrode may be secured relative to the first opposing wall 14, wherein the diaphragm is electrostatically pulled toward the first opposing wall 14 when a voltage is applied between the electrode of the diaphragm 20 and the electrode of the first opposing wall 14.

FIG. 3 is a cross-sectional side view of the illustrative normally closed valve of FIG. 1 with the diaphragm partially activated. As discussed above, the chamber 12 may have a first opposing wall 14 and a second opposing wall 16, with the second electrode 30 secured relative to the second opposing wall 16. As shown in FIG. 1, the first opposing wall 14 and the second opposing wall 16 may be configured such that the spacing between the first opposing wall 14 and the second opposing wall 16 is smaller in a first region of the chamber 12 than in an adjacent second region. In FIG. 1, the first region is toward the edge or edges of the chamber 12 and the second region is toward the center of the chamber 12. The diaphragm 20 is mounted between the first opposing wall 14 and the second opposing wall 16 such that the diaphragm can be electrostatically pulled toward the second electrode 30 in a rolling action, beginning in the first region. The rolling action may continue with additional activation, as shown in FIGS. 3 and 4. With the diaphragm 20 pulled away from the valve seat 23, fluid may flow between the first port 42 and the second port or ports 44a and 44b via the one or more openings 25a and 25b in the diaphragm 20, as shown by the arrows in FIG. 3.

It is contemplated that the openings 25a and 25b may or may not align with the second ports 44a and 44b when the diaphragm 20 is pulled adjacent the second opposing wall 16. In FIG. 4, the openings 25a and 25b are configured to be not aligned with the second ports 44a and 44b. Thus, in the embodiment shown in FIG. 4, the fluid flow may begin to slow or stop when the diaphragm 20 is pulled against the second opposing wall 16. In other embodiments, the openings 25a and 25b are configured to be aligned or substantially aligned with the second ports 44a and 44b when the diaphragm 20 is pulled adjacent the second opposing wall 16. In these embodiments, the fluid may continue to flow between the first port 42 and the second ports 44a and 44b when the diaphragm 20 is pulled adjacent the second opposing wall 16.

The rolling action of the diaphragm 20 may significantly reduce the voltage and power required to pull the diaphragm 20 toward the second opposing wall 16, while still achieving a significant diaphragm travel distance. This may be particularly beneficial in, for example, applications where a battery or some other limited power source is used to power the valve 5. A significant diaphragm travel distance may help improve the flow rate that the valve can accommodate, so long as the openings are also appropriately sized.

FIG. 5 is a cross-sectional side view of another illustrative normally closed valve in accordance with the present invention. This embodiment is similar to that shown in FIG. 1, but includes an additional or third electrode 52 along the first opposing wall 14. The third electrode 52 may be used to provide a restoring force or a supplemental restoring force to the diaphragm 20. For example, once the diaphragm has been displaced toward the second opposing wall 16, a voltage may be applied between the electrode of the diaphragm 20 and the third electrode 52. This may create an attractive electrostatic force between the electrodes, which pulls the diaphragm 20 toward the third electrode 52 and the first opposing wall 14 in a rolling action. The third electrode 52 may also be used to hold the diaphragm 20 against the first opposing wall 14 to keep the valve closed. This may be particular useful when the fluid pressure at the first port 42 may exceed the fluid pressure at the second ports 44a and 44b.

Figure 6:
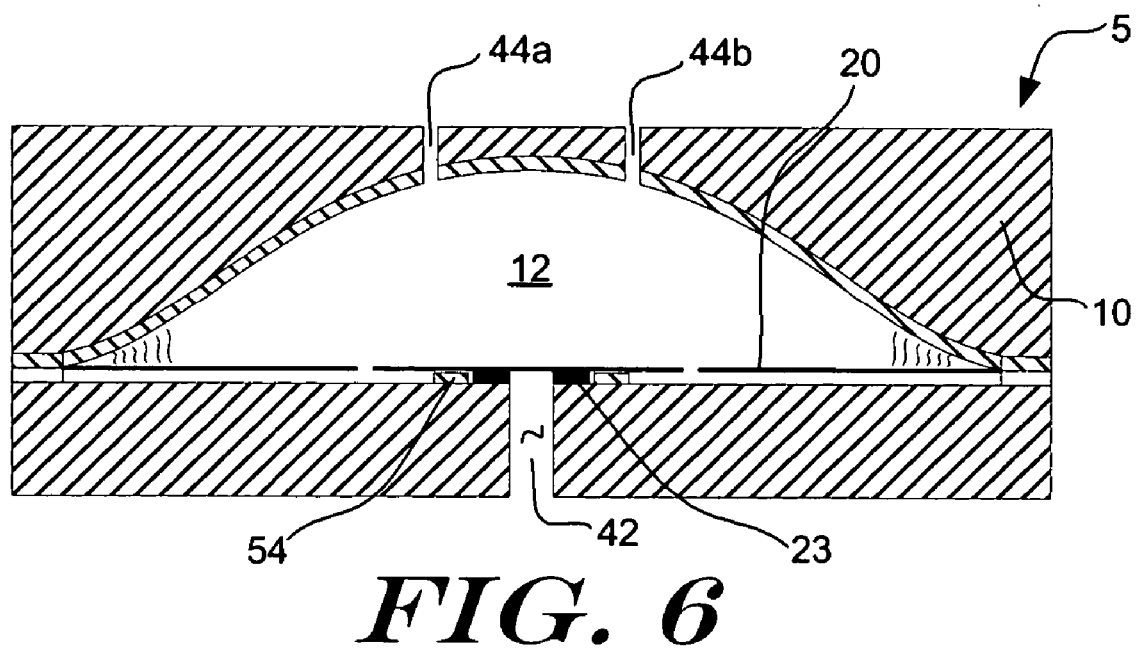
FIG. 6 is a cross-sectional side view of yet another illustrative normally closed valve in accordance with the present invention.

FIG. 6 is a cross-sectional side view of yet another illustrative normally closed valve in accordance with the present invention. This embodiment is similar to that shown in FIG. 5, but the third electrode 54 is only provided adjacent the valve seat 23. In this embodiment, the third electrode 54 may be used to keep the valve closed, particularly when the fluid pressure at the first port 42 may exceed the fluid pressure at the second ports 44a and 44b.

Figure 7:
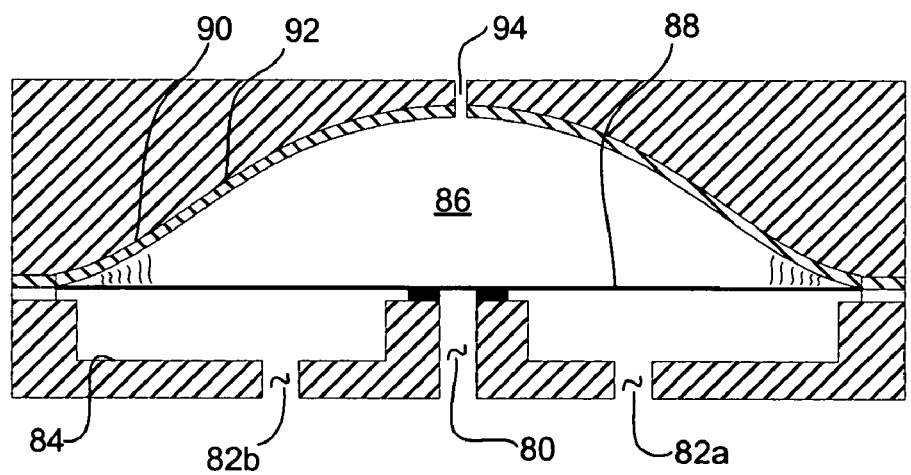
FIG. 7 is a cross-sectional side view of yet another illustrative normally closed valve in accordance with the present invention.
Figure 8:
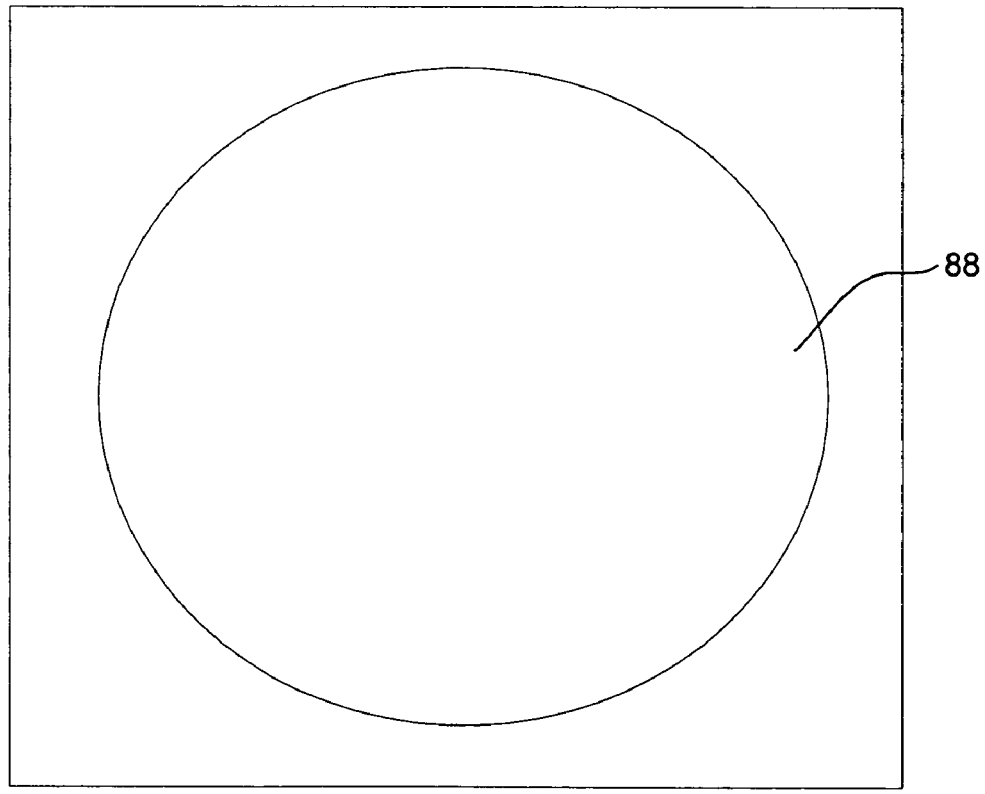
FIG. 8 is a cross-sectional top view of the illustrative normally closed valve of FIG. 7.
Figure 9:
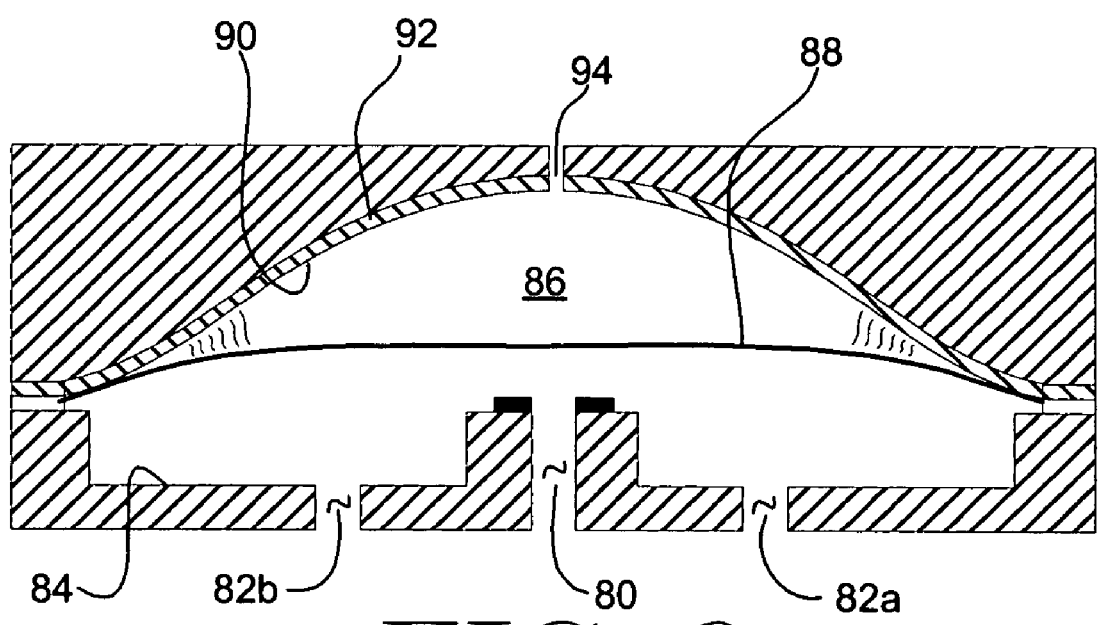
FIG. 9 is a cross-sectional side view of the illustrative normally closed valve of FIG. 7 with the diaphragm at least partially activated.

FIG. 7 is a cross-sectional side view of yet another illustrative normally closed valve in accordance with the present invention. In this illustrative embodiment, the first port 80 (e.g. input port) and the second port 82*a* (e.g. output ports 82*a* and 82*b*) are shown extending through a first opposing wall 84 of the valve and into the valve chamber 86. The diaphragm 88 is configured to cover or otherwise restrict fluid from flowing through the first port 80 and into the chamber 86 when the diaphragm 88 is in a first position adjacent the first opposing wall 84. When the diaphragm 88 is electrostatically pulled toward the second opposing wall 90, the diaphragm 88 may move away and uncover the first port 80, thereby allowing fluid to flow between the first port 80 and the second ports 82*a* and 82*b*. In this illustrative embodiment, the diaphragm 86 does not have any opening therein, as better shown in FIG. 8. FIG. 9 is a cross-sectional side view of the illustrative normally closed valve of FIG. 7 with the diaphragm at least partially activated. A back pressure relief or vent opening 94 may be provided in the second opposing wall to relieve any back pressure that might arise because of displacement of the diaphragm 88.

This illustrative embodiment may provide an electrostatically actuated valve that does not substantially expose the fluid to the electric field used to electrostatically actuate the valve. In the illustrative embodiment, the electric field used to actuate the valve only extends between the electrode of the diaphragm 88 and the electrode 92 of the second opposing wall 90. In some applications, the dielectric, conductive, polar or other properties of the fluid can affect the magnitude of the electrostatic force between the actuation electrodes of the valve, which can reduce the efficiency and/or reliability of the valve. In addition, the electric field applied between the electrodes of the valve may effect, impact or change the properties of the fluid. This illustrative embodiment may avoid some of these difficulties.

Figure 10:
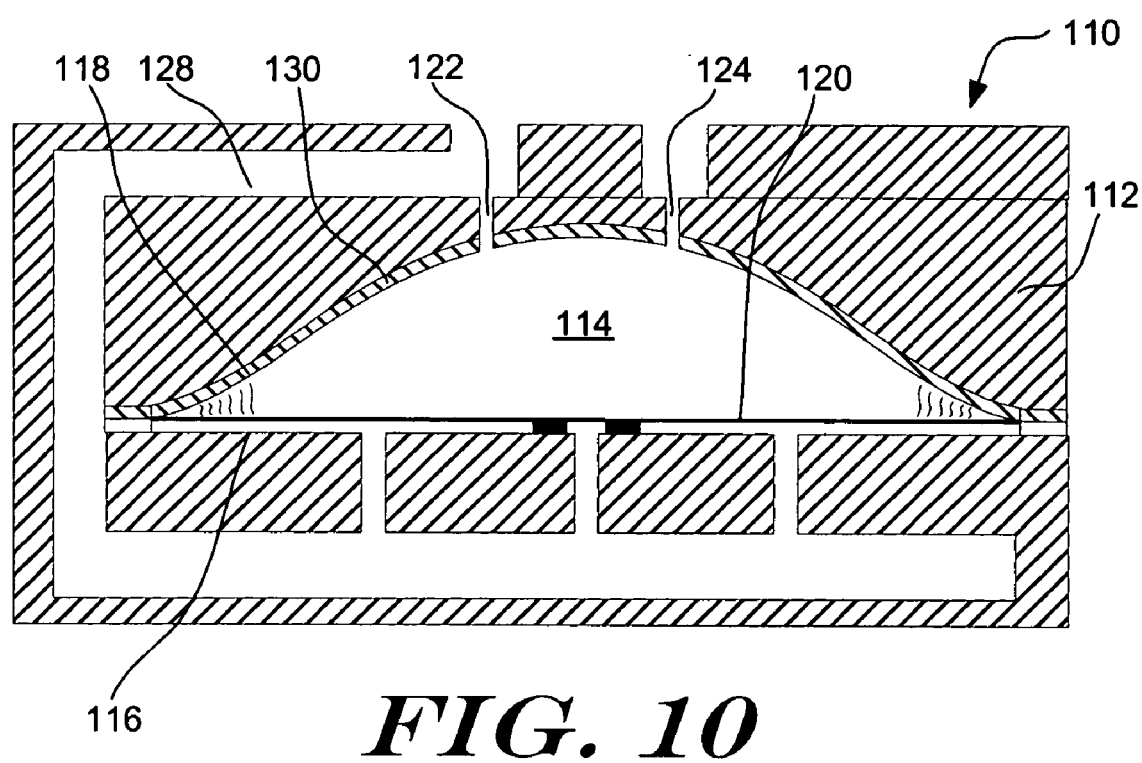
FIG. 10 is a cross-sectional side view of an illustrative normally open valve in accordance with the present invention.

FIG. 10 is a cross-sectional side view of an illustrative normally open valve in accordance with the present invention. This illustrative normally open valve is generally shown at 110, and includes a body 112 that is configured to form a chamber 114. The illustrative chamber 112 includes a first opposing wall 116 and a second opposing wall 118. The first opposing wall 116 and the second opposing wall 118 are configured such that the spacing between the first opposing wall 116 and the second opposing wall 118 is smaller in a first region of the chamber 114 than in an adjacent second region. In the illustrative embodiment, the first region is near the edges of the chamber 114 and the second region is away from the edges and near the center of the chamber 114. A diaphragm 120 is mounted between the first opposing wall 116 and the second opposing wall 118.

A first port 122 (e.g. inlet port) and a second port 124 (e.g. outlet port) are provided through the second opposing wall 118 and into the chamber 114. In the illustrative embodiment, a vent 128 is also provided. The vent 128 includes a fluid channel that extends from the first port 122, through the body 112, through the first opposing wall 116, and into the chamber 114.

The diaphragm 120 is mounted in the chamber 114, and has a first position adjacent the first opposing wall 116 that allows fluid to flow between the first port 122 and the second port 124 in the un-actuated state. A first electrode may be secured relative to the diaphragm, and a second electrode 130 may be secured relative to the second opposing wall 118.

Like above, the diaphragm 120 may be adapted to be electrostatically pulled toward the second electrode 130 in a rolling action, beginning in the first region, toward the second opposing wall when a voltage is applied between the electrode of the diaphragm 120 and the electrode 130 of the second opposing wall 118. When actuated, the diaphragm 120 may begin to restrict fluid flow between the first port 122 and the second port 124. Like above, and in some embodiments, the diaphragm 120 is elastically deformed when it is electrostatically pulled toward the second opposing wall 118, and returns to the first position adjacent the first opposing wall under elastic restoring forces.

As can be seen, the diaphragm 120 may separate the chamber 114 into a first part and a second part. The first part extends between the diaphragm 120 and the first opposing wall 116, and the second part extends between the diaphragm 120 and the second opposing wall 118. In the illustrative embodiment, the first part is in fluid communication with the first port 122 via vent 128, and the second part is in fluid communication with the first port 122 and the second port 124, at least when the diaphragm 120 is in the first position. By having both the first part and the second part in fluid communication with the first port 122 (e.g. inlet port), the actuation force required to move the diaphragm from a first position adjacent the first opposing wall 116 to a second position adjacent the second opposing wall may be reduced because there is little or no pressure differential across the diaphragm 120.

Figure 11:
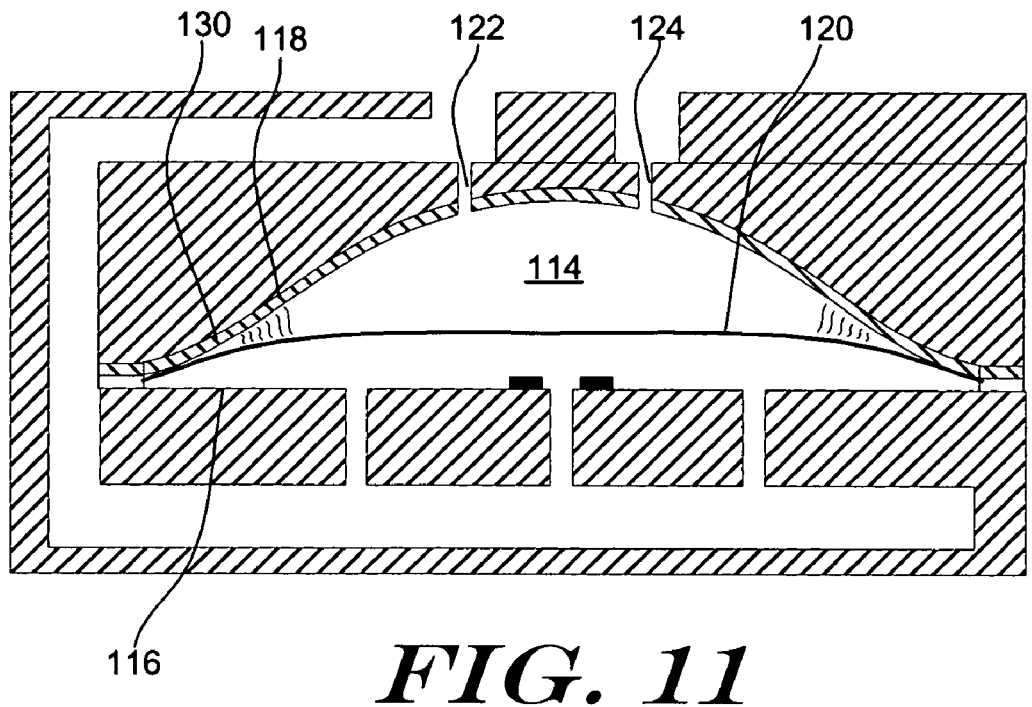
FIG. 11 is a cross-sectional side view of the illustrative normally open valve of FIG. 10 with the diaphragm partially activated.
Figure 12:
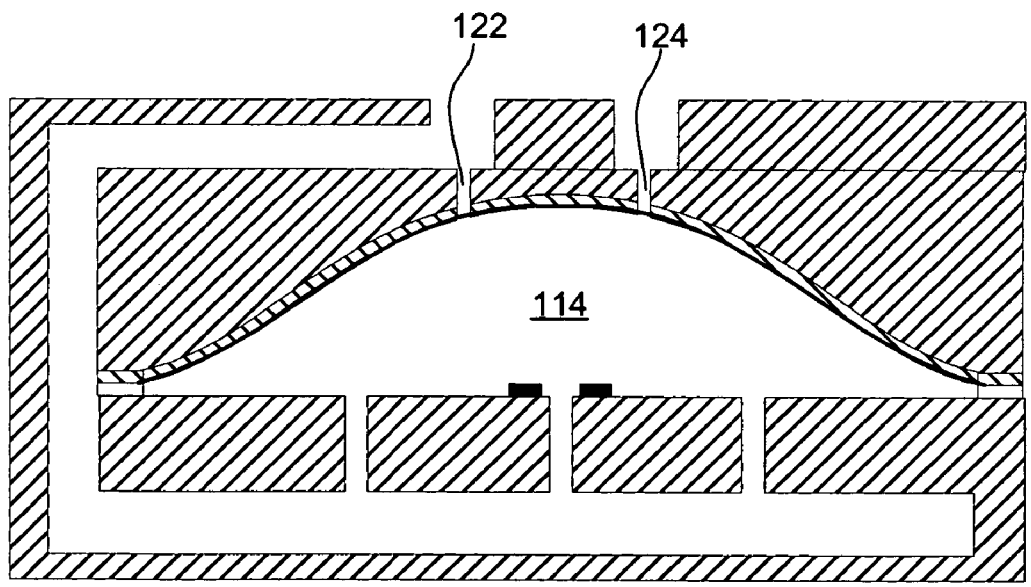
FIG. 12 is a cross-sectional side view of the illustrative normally open valve of FIG. 10 with the diaphragm fully activated.

FIG. 11 is a cross-sectional side view of the illustrative normally open valve of FIG. 10 with the diaphragm partially activated. As discussed above, the chamber 114 may have a first opposing wall 116 and a second opposing wall 118, with the second electrode 130 secured relative to the second opposing wall 118. The diaphragm 120 is mounted between the first opposing wall 116 and the second opposing wall 118 such that the diaphragm can be electrostatically pulled toward the second electrode 130 in a rolling action. The rolling action may continue with additional activation, as shown in FIG. 11. This rolling action may significantly reduce the voltage and power required to pull the diaphragm 120 toward the second opposing wall 118, while still achieving a significant diaphragm travel distance. FIG. 12 is a cross-sectional side view of the illustrative normally open valve of FIG. 10 with the diaphragm fully activated. As can be seen, the diaphragm 120 may be sufficiently activated to reduce or even prevent fluid flow between the first port 122 and the second port 124, thereby closing the valve.

Figure 13:
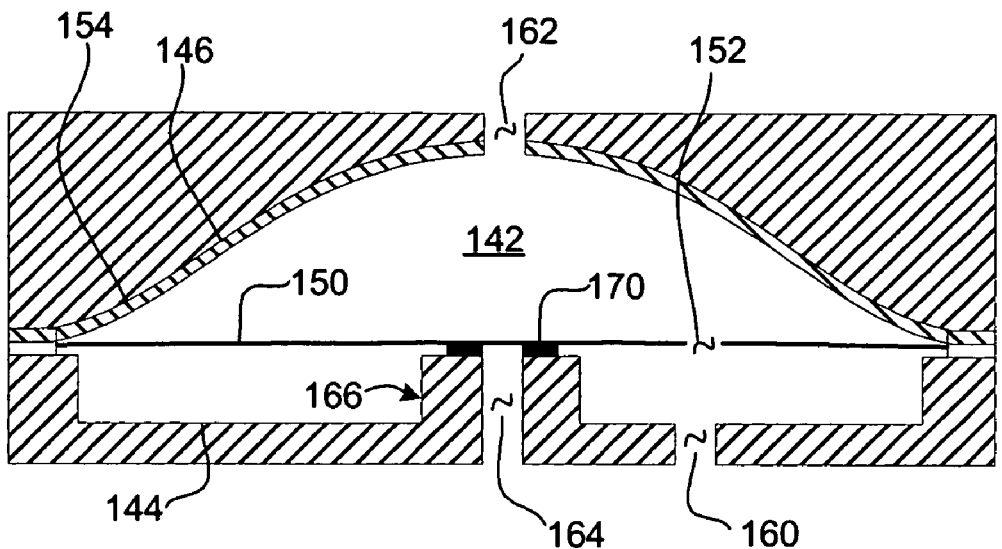
FIG. 13 is a cross-sectional side view of an illustrative three-way valve in accordance with the present invention.

FIG. 13 is a cross-sectional side view of an illustrative three-way valve in accordance with the present invention. The illustrative three-way valve includes a body 140 that is configured to form a chamber 142. The chamber 142 has a first opposing wall 144 and a second opposing wall 146. A diaphragm 150, which is mounted between the first opposing wall 144 and the second opposing wall 156, may include an opening 152. A first electrode (not explicitly shown but as described above) is secured to the diaphragm 150, and a second electrode 154 is secured to the second opposing wall 146. An inlet port 160 may extend through the first opposing wall 144 and into the chamber 142. A first outlet port 162 may extend through the second opposing wall 146 and into the chamber 142, and a second outlet port 164 may extend through the first opposing wall and into the chamber 142. The inlet port 160 and the second outlet port 164 are shown laterally spaced from one another, with the second outlet port 164 defined by an annular protrusion 166 that extends further into the chamber 142. In some embodiments, a valve seat 170 is provided along the top of the annular protrusion 166.

In FIG. 13, the diaphragm 150 is shown in a first position adjacent the first opposing wall 144. The diaphragm 150 extends along the valve seat 170, which helps restrict or otherwise provide a seal between the first opposing wall 144 and the diaphragm 150. Thus, in the first position, the diaphragm 150 allows fluid to flow between an inlet port 160 and the first outlet port 162 through the opening 152, while restricting or preventing fluid from flowing between the inlet port 160 and the second outlet port 164

Figure 14:
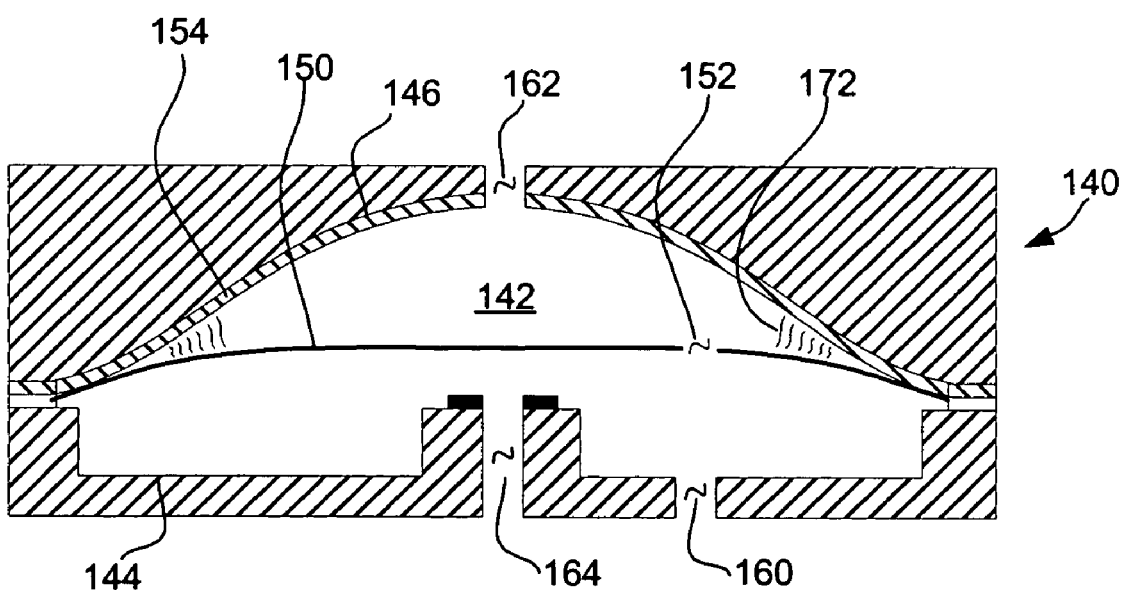
FIG. 14 is a cross-sectional side view of the illustrative three-way valve of FIG. 13 with the diaphragm partially activated.

FIG. 14 is a cross-sectional side view of the illustrative three-way valve of FIG. 13 with the diaphragm partially activated. As shown, the diaphragm 150 may be electrostatically pulled toward the second electrode 154 in a rolling action when a voltage is applied between the first electrode on the diaphragm 150 and the second electrode 154. The electric field is illustrated at 172. When activated, the diaphragm 150 moves toward the second opposing wall 146, and away from the first opposing wall 144 and the valve seat 170. As the diaphragm 150 moves away from the first opposing wall 144, fluid can flow between the inlet port 160 and the second outlet port 164.

Figure 15:
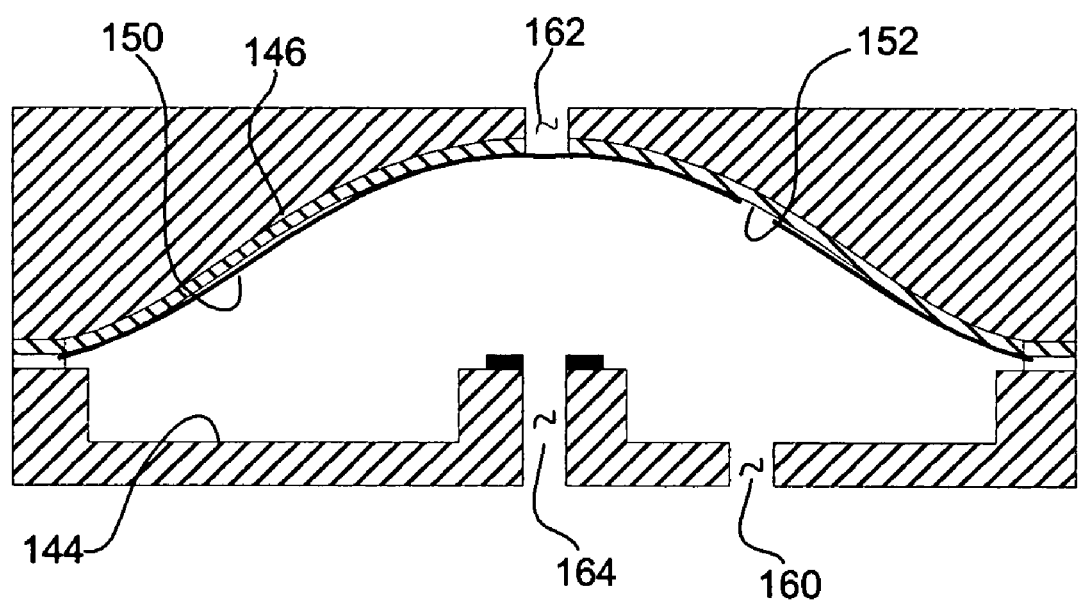
FIG. 15 is a cross-sectional side view of the illustrative three-way valve of FIG. 14 with the diaphragm further activated.

FIG. 15 is a cross-sectional side view of the illustrative three-way valve of FIG. 14 with the diaphragm fully activated. As shown in FIG. 15, when the diaphragm 150 is electrostatically pulled closer to the second opposing wall 146, the opening 152 in the diaphragm 150 begins to become restricted, which restricts and eventually prevents or substantially prevents fluid from flowing between the inlet port 160 and the first outlet port 162. In addition, as the diaphragm 150 is moved away from the first opposing wall 144, the fluid communication path between the inlet port 160 and the second outlet port 164 becomes less restricted, allowing greater flow for a given inlet pressure.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed.

What is claimed is:

1. An electrostatic actuated valve comprising:
    a body forming a chamber;
    the chamber having an inlet port, a first outlet port, and a second outlet port;
    a diaphragm mounted in the chamber, said diaphragm having a first position that allows fluid communication between the inlet port and the first outlet port while restricting fluid communication between the inlet port and the second outlet port, and a second position that allows fluid communication between the inlet port and the second outlet port while restricting fluid communication between the inlet port and the first outlet port;
    a first electrode secured relative to the diaphragm;
    a second electrode secured relative to the body; and
    wherein the diaphragm is electrostatically actuated between the first position and the second position when a voltage is applied between the first electrode and the second electrode; wherein the chamber includes a first opposing wall and a second opposing wall, the inlet port and the second outlet port extending through the first opposing wall and the first outlet port extending through the second opposing wall.

2. An electrostatic actuated valve according to claim 1 wherein the diaphragm includes at least one opening.

3. An electrostatic actuated valve according to claim 2 wherein the diaphragm covers or otherwise restricts fluid flow through the second outlet port and allows fluid flow between the inlet port and the first outlet port via the at least one opening in the diaphragm in the first position.

4. An electrostatic actuated valve according to claim 3 wherein the diaphragm uncovers and allows fluid flow between the inlet port and the second outlet port in the second position.

5. An electrostatic actuated valve according to claim 4 wherein the at least one opening in the diaphragm is restricted when the diaphragm is in the second position, thereby restricting fluid flow between the inlet port and the first outlet port.

6. An electrostatic actuated valve according to claim 1 wherein the chamber has a first opposing wall and a second opposing wall, the first opposing wall and the second opposing wall being configured such that the spacing between the first opposing wall and the second opposing wall is smaller in a first region of the chamber than in an adjacent second region, the diaphragm being mounted between the first opposing wall and the second opposing wall such that the diaphragm is electrostatically pulled toward the second electrode in a rolling action beginning in the first region.

7. An electrostatic actuated valve according to claim 1 wherein the diaphragm has an opening therethrough such that:
    when the diaphragm is in the first position the opening is occluded; and
    when the diaphragm is in the second position the opening is not occluded.

8. An electrostatic actuated valve according to claim 7 wherein the opening is placed in alignment with the inlet port, such that when the diaphragm is in the first position, the opening is adjacent the inlet port, and when the diaphragm is in the second position, the opening is not adjacent the inlet port.

9. An electrostatic actuated valve according to claim 8 wherein:
    the chamber includes first and second opposing walls;
    the inlet port is on the first wall; and
    when the diaphragm is in the second position the opening, is occluded by the second wall.

10. An electrostatic actuated valve comprising:
    a body forming a chamber;
    the chamber having a first port, a second port, and a third port;
    a diaphragm mounted in the chamber, said diaphragm having a first position that allows fluid communication between the first port and the second port while restricting fluid communication between the first port and the third port, and a second position that allows fluid communication between the first port and the third port while restricting fluid communication between the first and the second port, said diaphragm including at least one opening;
    a first electrode secured relative to the diaphragm;
    a second electrode secured relative to the body; and
    wherein the diaphragm and electrodes are configured for electrostatic actuation between the first position and the second position when a voltage is applied between the first electrode and the second electrode.

11. An electrostatic actuated valve according to claim 10 wherein the chamber has a first opposing wall and a second opposing wall, the first opposing wall and the second opposing wall being configured such that the spacing between the first opposing wall and the second opposing wall is smaller in a first region of the chamber than in an adjacent second region.

12. The electrostatic actuated valve of claim 11 wherein, the diaphragm is mounted between the first opposing wall and the second opposing wall such that the diaphragm is electrostatically pulled toward the second electrode in a rolling action beginning in the first region.

13. An electrostatic actuated valve according to claim 11 wherein the opening in the diaphragm is placed such that:
   when the diaphragm is in the first position the opening is occluded; and
   when the diaphragm is in the second position the opening is not occluded.

14. An electrostatic actuated valve according to claim 13 wherein the opening is placed in alignment with the first port, such that when the diaphragm is in the second position, the opening is adjacent the first port, and when the diaphragm is in the second position, the opening is not adjacent the first port.

15. An electrostatic actuated valve according to claim 14 wherein:
   the chamber includes first and second opposing walls;
   the first port is on the first wall; and,
   when the diaphragm is in the second position, the opening is occluded by the second wall.

16. An electrostatic actuated valve comprising:
   a body forming a chamber;
   the chamber having an inlet port, a first outlet port, and a second outlet port;
   a diaphragm mounted in the chamber, said diaphragm having a first position that allows fluid communication between the inlet port and the first outlet port while restricting fluid communication between the inlet port and the second outlet port, and a second position that allows fluid communication between the inlet port and the second outlet port while restricting fluid communication between the inlet port and the first outlet port;
   a first electrode secured relative to the diaphragm;
   a second electrode secured relative to the body; and
   wherein the diaphragm is electrostatically actuated between the first position and the second position when a voltage is applied between the first electrode and the second electrode; wherein the chamber has a first opposing wall and a second opposing wall, the first opposing wall and the second opposing wall being configured such that the spacing between the first opposing wall and the second opposing wall is smaller in a first region of the chamber than in an adjacent second region, the diaphragm being mounted between the first opposing wall and the second opposing wall such that the diaphragm is electrostatically pulled toward the second electrode in a rolling action beginning in the first region.

17. An electrostatic actuated valve comprising;
   a body forming a chamber;
   the chamber having a first port, a second port, and a third port;
   a diaphragm mounted in the chamber, said diaphragm having a first position that allows fluid communication between the first port and the second port while restricting fluid communication between the first port and the third port, and a second position that allows fluid communication between the first port and the third port while restricting fluid communication between the first and the second port, wherein a portion of the diaphragm adjacent the third port when the diaphragm is in the first position moves toward the second port when the diaphragm is in the second position;
   a first electrode secured relative to the diaphragm;
   a second electrode secured relative to the body; and
   wherein the diaphragm and electrodes are configured for electrostatic actuation between the first position and the second position when a voltage is applied between the first electrode and the second electrode.

18. An electrostatic actuated valve comprising:
   a body forming a chamber;
   the chamber having a first port, a second port, and a third port;
   a diaphragm mounted in the chamber, said diaphragm having a first position that allows fluid communication between the first port and the second port while restricting fluid communication between the first port and the third port, and a second position that allows fluid communication between the first port and the third port while restricting fluid communication between the first and the second port, wherein the diaphragm moves from a less deformed configuration in the first position to a more deformed configuration in the second position;
   a first electrode secured relative to the diaphragm;
   a second electrode secured relative to the body; and
   wherein the diaphragm and electrodes are configured for electrostatic actuation between the first position and the second position when a voltage is applied between the first electrode and the second electrode.

* * * * *